(12) United States Patent
Noguchi

(10) Patent No.: US 10,693,941 B2
(45) Date of Patent: *Jun. 23, 2020

(54) SESSION MANAGEMENT

(71) Applicant: International Business Machines Corporation, Armonk, NY (US)

(72) Inventor: Atsushi Noguchi, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,437

(22) Filed: Mar. 28, 2019

(65) Prior Publication Data

US 2019/0222627 A1    Jul. 18, 2019

Related U.S. Application Data

(63) Continuation of application No. 14/936,289, filed on Nov. 9, 2015, now Pat. No. 10,284,621.

(51) Int. Cl.
  *H04L 29/08*    (2006.01)

(52) U.S. Cl.
  CPC .......... *H04L 67/02* (2013.01); *H04L 67/1095* (2013.01); *H04L 67/145* (2013.01)

(58) Field of Classification Search
  CPC .... H04L 67/02; H04L 67/145; H04L 67/1095
  USPC ....................................................... 709/228
  See application file for complete search history.

(56) References Cited

U.S. PATENT DOCUMENTS

| 5,913,029 | A | 6/1999 | Shostak |
| 7,543,066 | B2 | 6/2009 | Colasurdo et al. |
| 7,716,274 | B1 | 5/2010 | Kumar |
| 7,962,566 | B2 | 6/2011 | Smits |
| 8,015,561 | B2 | 9/2011 | Stanev |
| 9,779,116 | B2 | 10/2017 | Colrain et al. |
| 2002/0152429 | A1* | 10/2002 | Bergsten ............. G06F 11/1471 714/43 |
| 2004/0205177 | A1 | 10/2004 | Levy et al. |
| 2005/0033755 | A1 | 2/2005 | Gokhale et al. |
| 2007/0150600 | A1 | 6/2007 | Barsness et al. |
| 2007/0150602 | A1 | 6/2007 | Yared et al. |
| 2007/0174660 | A1 | 7/2007 | Peddada |
| 2009/0181775 | A1 | 7/2009 | Nilsson et al. |
| 2012/0066394 | A1 | 3/2012 | Ravanuru et al. |
| 2012/0166866 | A1 | 6/2012 | Rao et al. |
| 2013/0066837 | A1* | 3/2013 | Colrain ............... G06F 16/2365 707/674 |
| 2013/0066955 | A1 | 3/2013 | Neel et al. |
| 2013/0086138 | A1 | 4/2013 | Noguchi |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Minh Chau Nguyen
(74) *Attorney, Agent, or Firm* — Heslin Rothenberg Farley & Mesiti P.C.; Stephanie Carusillo, Esq.

(57) ABSTRACT

Methods, systems, and computer program products include, for example, transmitting, by one or more processor, session copy data from a server for storage on a client, and requesting, by the one or more processor, transmission of the stored session copy data from the client in response to loss of session data being detected on the server.

17 Claims, 9 Drawing Sheets

(56) References Cited

U.S. PATENT DOCUMENTS

2014/0344326 A1* 11/2014 Kamath .............. H04L 67/1008
709/203
2015/0177719 A1   6/2015 Wang et al.
2015/0195221 A1   7/2015 Rasmussen et al.

OTHER PUBLICATIONS

Comet Programming, Wikipedia, https://en.wikipedia.org/wiki/Comet_(programming), 4-pages, printout, Jul. 27, 2015.
WebSocket, Wikipedia, https://en.wikipedia.org/wiki/WebSocket, 4-pages, printout Jul. 27, 2015.
Interface HttpSession (Java EE 6), https://docs.oracle.com/javaee/6/api/javax/servlet/http/HttpSessi . . . , 4-pages, printout Jul. 22, 2015.
Designing Web System Infrastructure with WAS V8.0 IBM Corporation, 1 page, 2012.
List of IBM Patents or Patent Applications Treated as Related, Apr. 1, 2019, 2 pages.

* cited by examiner

SESSION MANAGEMENT

TECHNICAL FIELD

The present disclosure relates generally to session management, and more particularly, to methods, computer program products, and systems for example, caching session data for use in maintaining a session between a server and a client.

BACKGROUND

Conventionally, when a failure in a Java virtual machine occurs, and there is no countermeasure to such failure, session data will be lost, and a client has to establish a new connection to a server from scratch.

SUMMARY

Shortcomings of the prior art are overcome and additional advantages are provided through the provision, in one embodiment, of a method which includes, for example, transmitting, by one or more processor, session copy data from a server for storage on a client, and requesting, by the one or more processor, transmission of the stored session copy data from the client in response to loss of session data being detected on the server.

In another embodiment, a computer program product is provided. The computer program product includes: a computer readable storage medium readable by one or more processing unit and storing instructions for execution by the one or more processor for performing a method which includes, for example, transmitting session copy data from a server for storage on a client, and requesting transmission of the stored session copy data from the client in response to loss of session data being detected on the server.

In a further embodiment, a system is provided. The system includes: a memory; and one or more processor in communication with the memory, where the system is configured to perform a method which includes, for example, transmitting session copy data from a server for storage on a client, and requesting transmission of the stored session copy data from the client in response to loss of session data being detected on the server.

Additional features and advantages are realized through the techniques set forth herein. Other embodiments are described in detail herein and are considered a part of the claimed invention.

BRIEF DESCRIPTION OF THE DRAWINGS

One or more embodiment of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
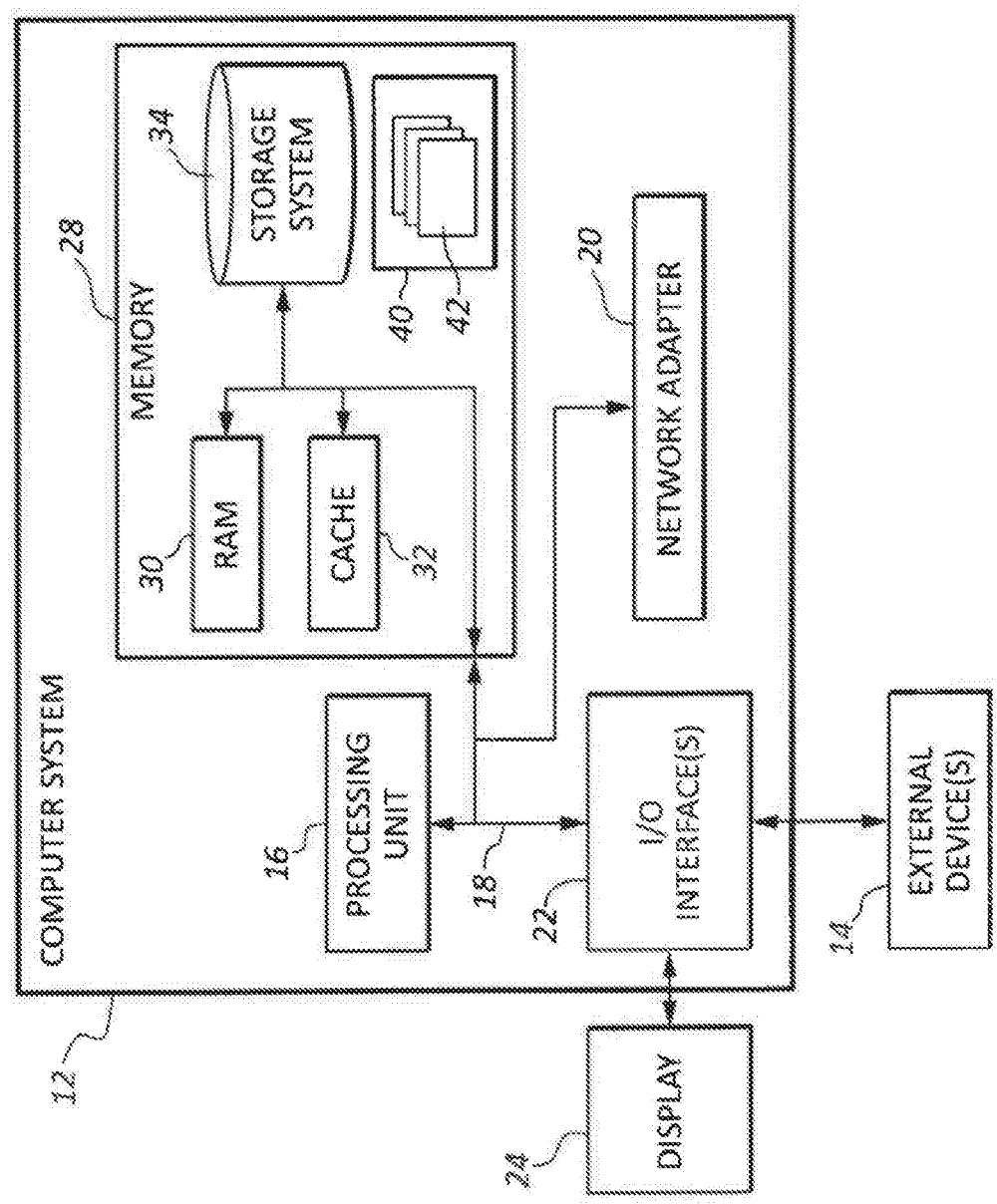
FIG. 1 depicts a cloud computing node according to an embodiment of the present invention.

Embodiments of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating embodiments of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software, for example, for maintaining a session between a server and a client, particularly when a failure such as a failure in a Java virtual machine results in the client having to establish a connection to the server from scratch. In one or more embodiments, a method or system may be operable so that session copy data is sent to the client and stored on the client (not on the server) by using, for example, WebSocket. For example, WebSocket, which is an extended specification of Hypertext Transfer Protocol (HTTP), enables bidirectional communications between a Web (application) server and a Web browser. With such a technique, the use of Web Socket makes it possible to send the session copy data from the server side to the client side and store the session copy data on the client side. The session copy data may be transmitted in an asynchronous manner or separately at different times compared to, for example, normal user requests from the client to send the user requested session data. Accordingly, since the session copy data for storage on the client does not occur in the normal interactions between the client and the server, it will be appreciated that an increase in traffic due to transmission of session copy data for storage on the client may have limited, or no effect, effect on normal user interactions between the client and the server. In one or more embodiments, a method or system may be operable so that session copy data is sent to the client and stored on the client (not on the server) by using, for example, Comet. Comet is not an extended specification of HTTP, but enables notification in pseudo real time of event occurrence on the server side to the client side. Both of these techniques, WebSocket and Comet, enable asynchronous communications from the server side, in contrast to a general HTTP communications in which communication is triggered by an operation by a user or the like on the client side (for example, a browser).

While the description hereafter employ a Web Socket protocol, it is appreciated that the present invention may be implemented using a Comet protocol.

The technique of the present disclosure provides advantages over storing of session data in, for example, a cookie, which storing of session data in a cookie has constraints on data size and increases traffic between the server and client. In addition, in contrast to the use of a cookie to store session data, in the technique of the present disclosure, the client does not need to send the session data (to the server) in a normal state. Further, in the present technique, a request by the server to the client to send the stored session copy data to the server may occur only when a loss of session data has been detected on the server. The present technique provides advantages over storing session data in a database, in another Java virtual machine, or in another dedicated device, which leads to complexity of the server configuration and increase in the server cost (e.g., increased hardware/software).

FIGS. 1-4 depict various embodiments of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
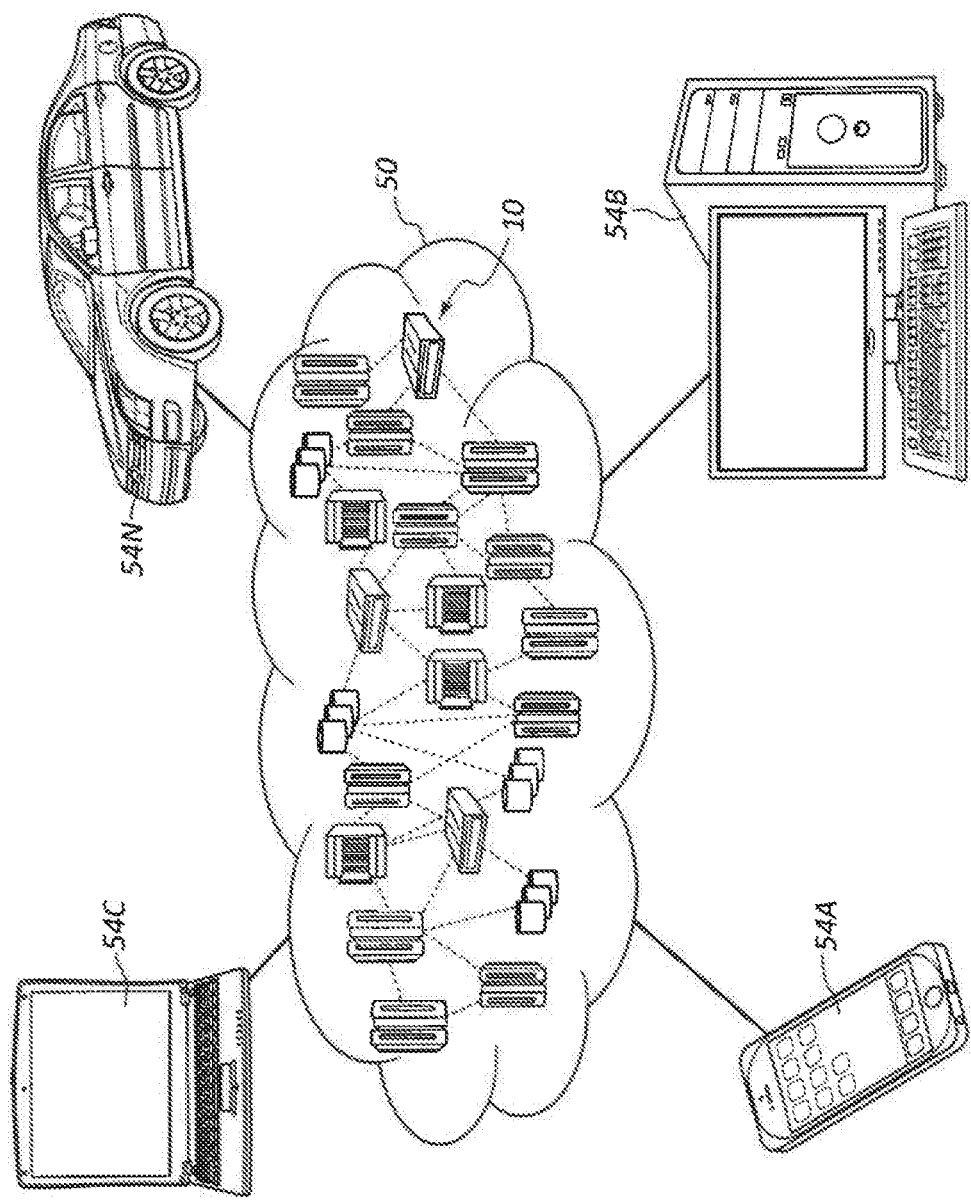
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
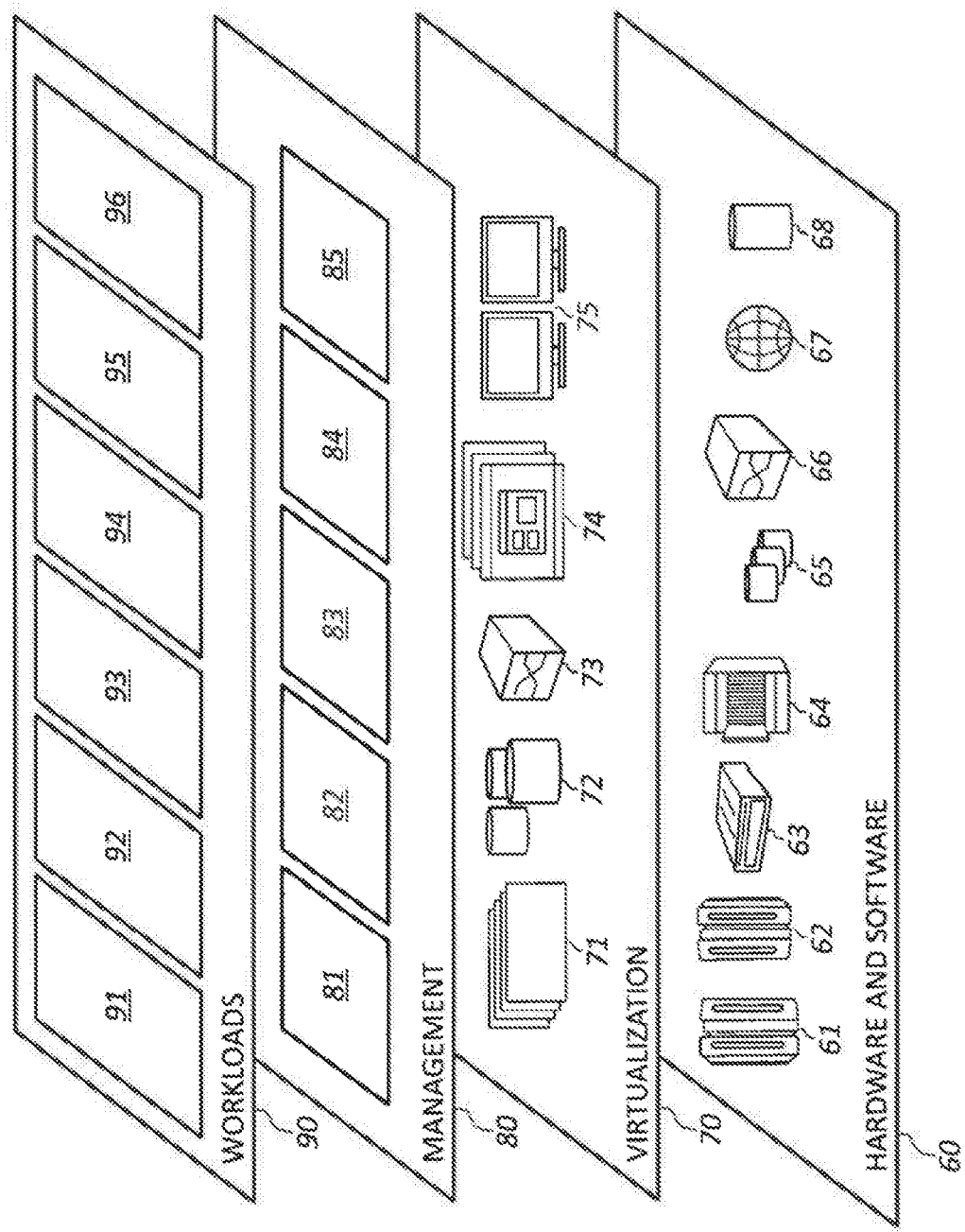
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and session management 96 as described herein.

Figure 4:
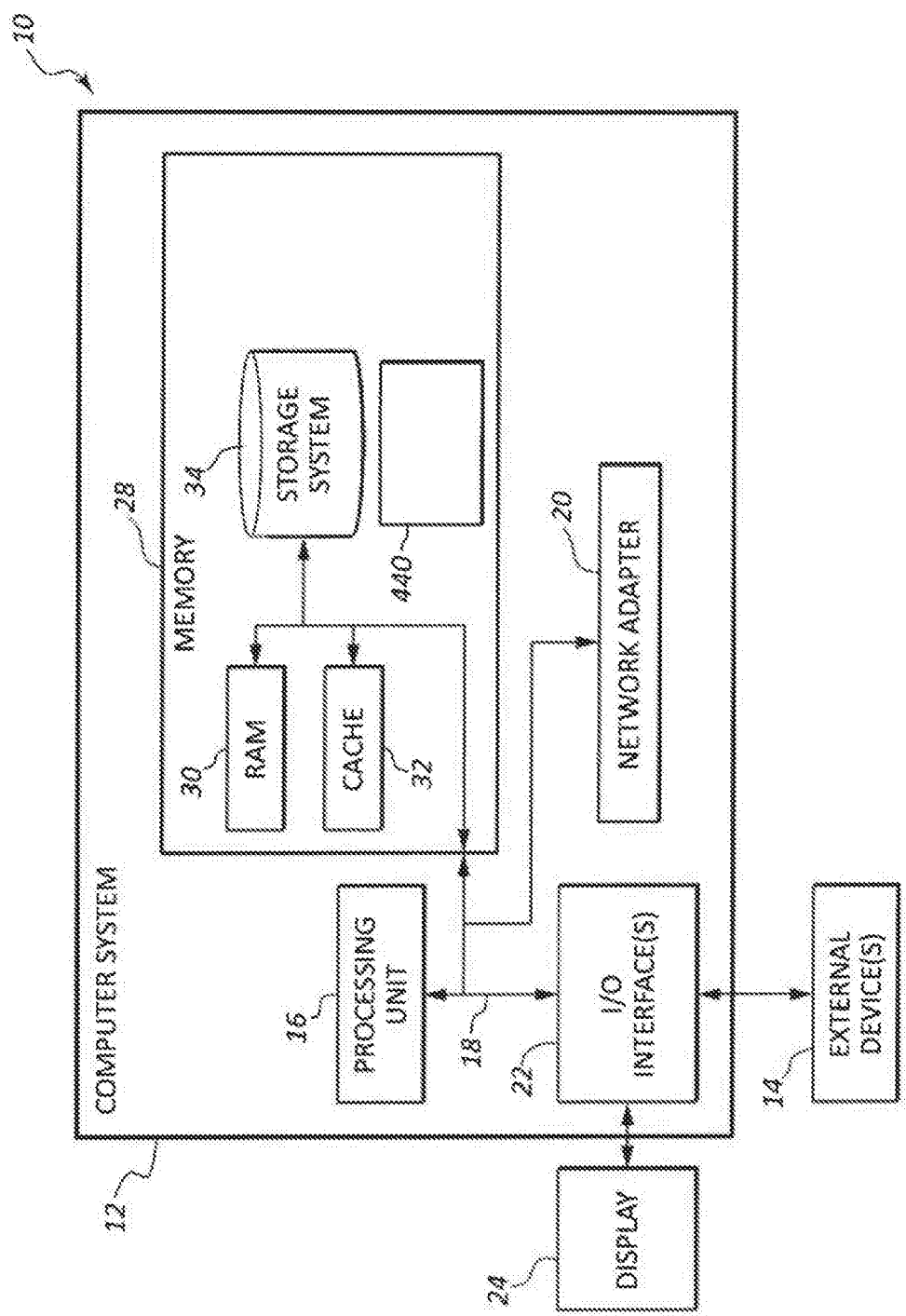
FIG. 4 depicts a hardware overview of a computing node, which may be a cloud computing node, in accordance with one or more embodiments set forth herein.

FIG. 4 depicts a hardware overview of a computing node 10, which may be a cloud computing node, in accordance with one or more embodiments set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc.

Program/utility 40 as set forth in FIG. 1 can provide the functionality of session management 96 as set forth in FIG. 3. Program/utility 40 as set forth in FIG. 1 can include one or more program 440 as set forth in FIG. 4.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441) generally carry out the functions and/or methodologies of embodiments of the invention as described herein, such as session management 96 (FIG. 3).

Referring again to FIG. 4:

The present invention may be a system, a method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
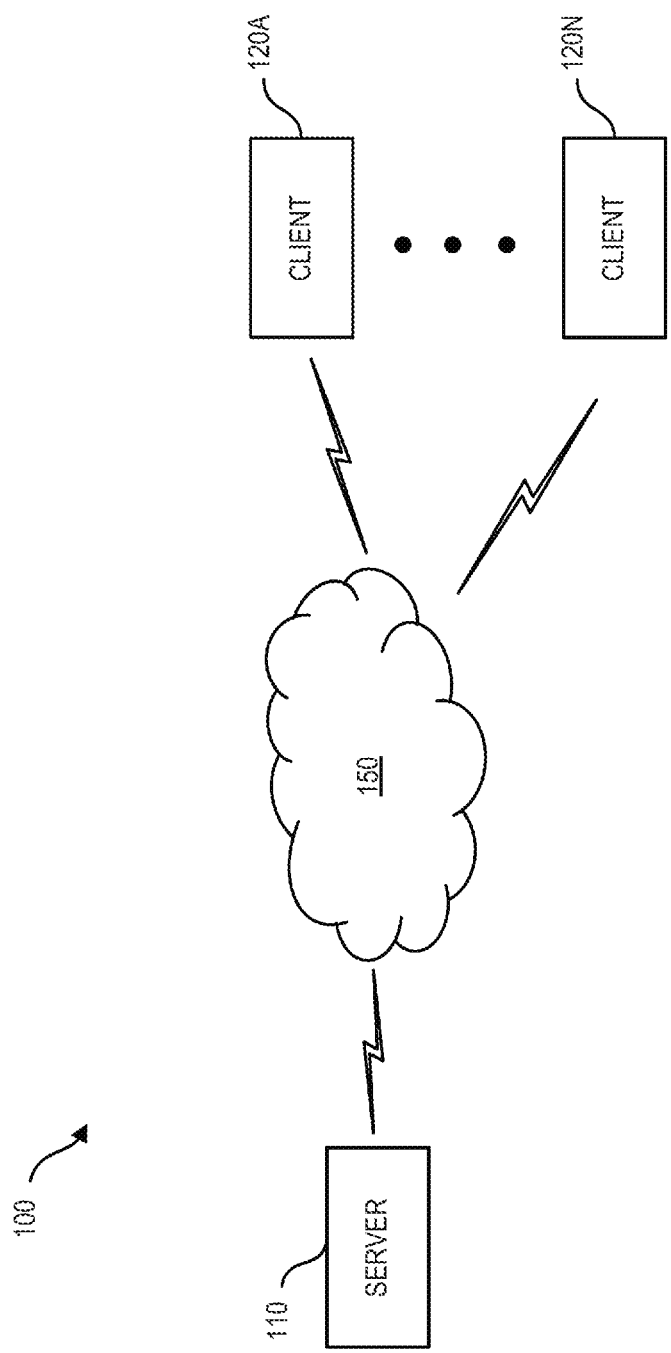
FIG. 5 is an exemplary block diagram of a system in accordance with one or more embodiments set forth herein.

FIG. 5 is an exemplary block diagram of a system 100 in accordance with one or more embodiments set forth herein. For example, a network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which one or more server 110 may, for example, can be in communication with one or more clients 120A to 120N. Server 110 is an example of computing node 10 (FIG. 4). Client 110 is an example of computing node 10 (FIG. 4). As described in greater detail below, server 110 may be effective in maintaining sessions between server 110 and clients 120A to 120N, for example, when a failure occurs in a Java virtual machine (JVM).

Figure 6:
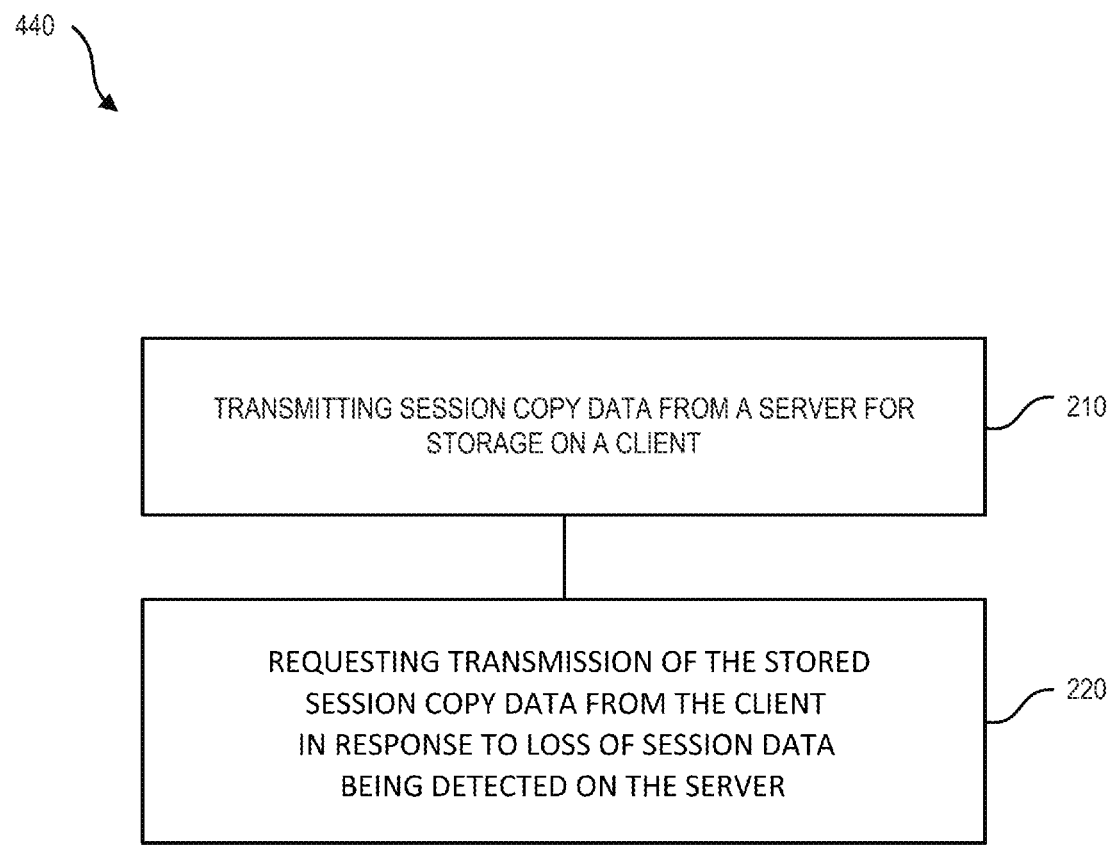
FIG. 6 illustrates a process in accordance with embodiments of the present invention.

FIG. 6 illustrates a process in accordance with embodiments of the present invention. By way of example, the process described with respect to FIG. 6 can be performed using one or more program 440 (FIG. 4) on one or more server 110 (FIG. 5), as detailed with respect to FIG. 4.

For example, one or more program 440 may be operable for use in maintaining a session between a server and a client, and include at 210, transmitting session copy data from a server for storage on a client (e.g., by one or more program 440 operating on server 110 of FIG. 5), and at 220, requesting transmission of the stored session copy data from the client in response to loss of session data being detected on the server (e.g., by one or more program 440 operating on server 110 of FIG. 5).

Figure 7:
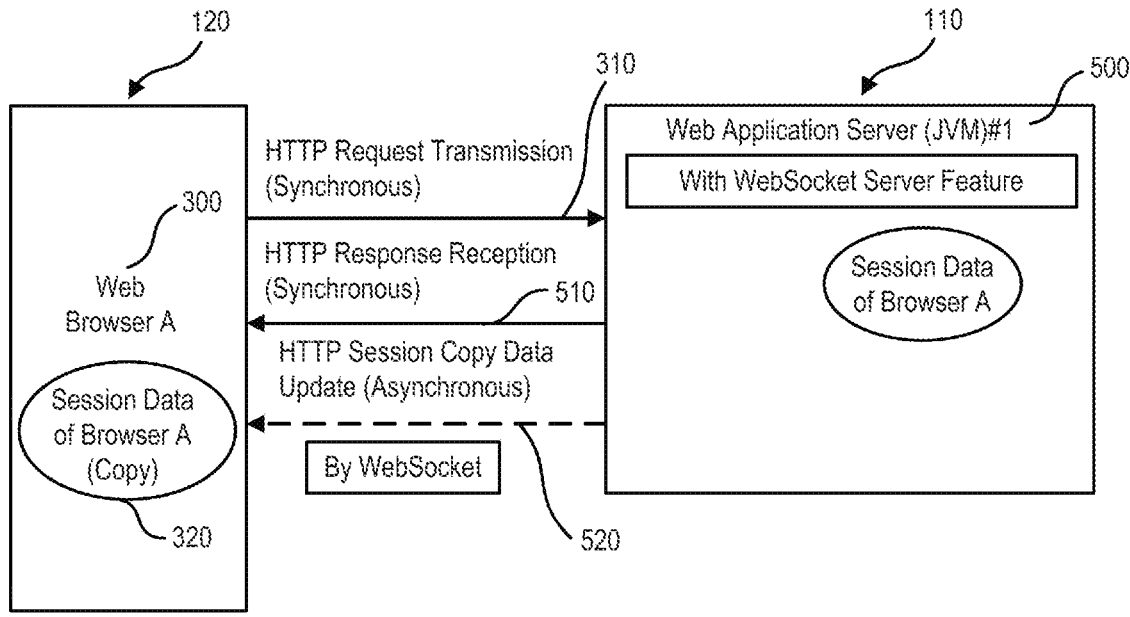
FIGS. 7 and 8 together are a schematic representation of a process in accordance with an embodiment of the present invention.
Figure 8:
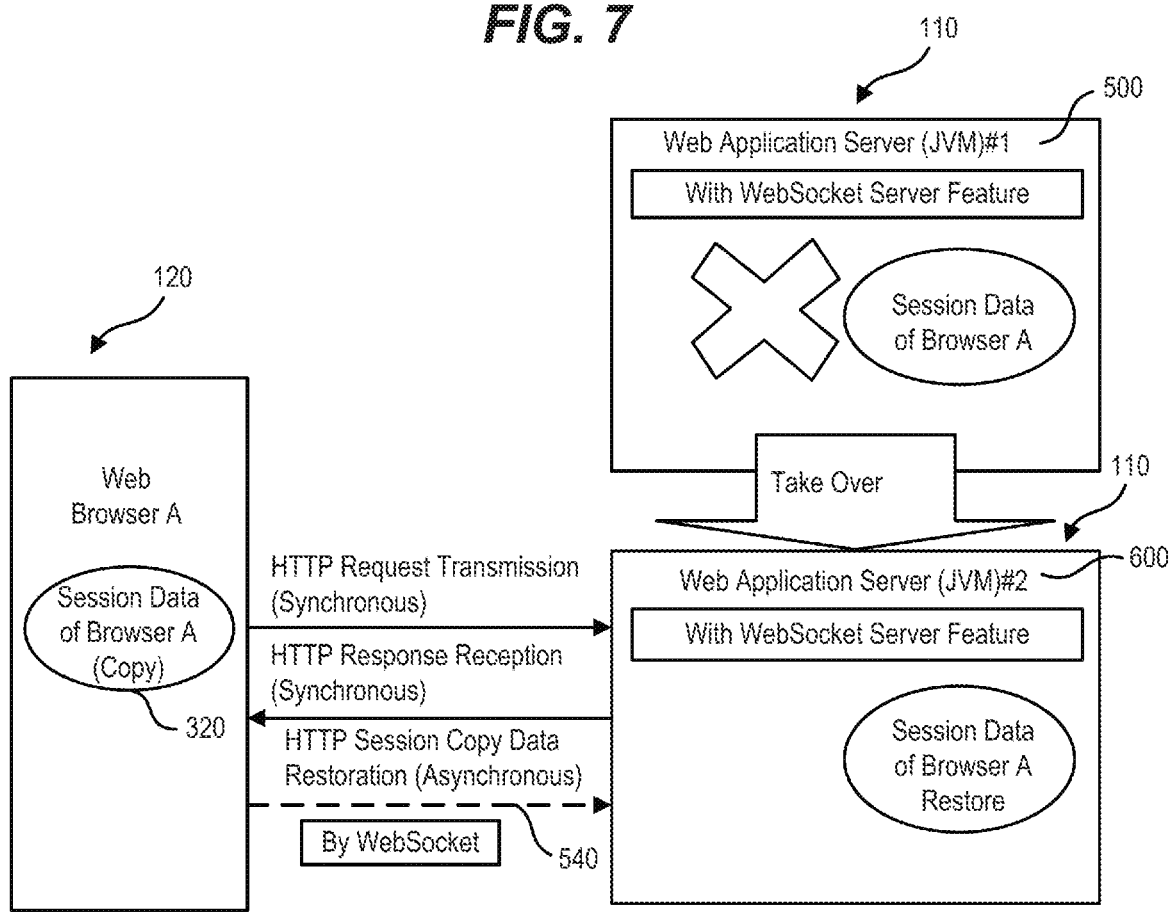

FIGS. 7 and 8 schematically represent a process in accordance with an embodiment of the present invention. For example, initially with reference to FIG. 7, client 120 (e.g., client 120 of FIG. 5) may operate a web browser 300. A user using web browser 300 may affect an http request transmission 310 which is received at server 110 (e.g., server 110 of FIG. 5) configured as a web application server 500 having a Web Socket protocol server feature. Server 110 operating web application server 500 may forward an http response transmission 510 which is received at client 120 web browser 300 (e.g., server 110 of FIG. 5). Transmissions 310 and 510 may be general or normal data transmissions between the client and the server.

In addition, web application server 500 employing, for example, WebSocket protocol, may forward a separate or asynchronous http session data update transmission or session copy data 520 (e.g., by one or more program 440 of FIG. 6 operating on server 110 of FIG. 5) to web browser 300, which asynchronous http session data update transmission or session copy data of browser 320 is received and held by client 120 (e.g., client 120 of FIG. 5 operating one or more program 440 of FIG. 4). As described below, a purpose of maintaining a copy of session data by the client provides a countermeasure to a session failure such on the server, such as a Java virtual machine failure.

As shown in FIG. 8, in response to a session failure occurring in server 110 operating web application server 500, a new web application server 600 (e.g., one or more program 440 operating on server 110 of FIG. 5) may take over and be configured using session copy data 320 held by client 120. For example, a session copy data transmission 540 may be made or sent from client 120 (e.g., by one or more program 440 of FIG. 4 operating on client 120 of FIG. 5) to server 110 operating web application server 600, as further described below, so that it is possible to continue the user's operation given the session state at the point prior to the failure recovery.

Figure 9:
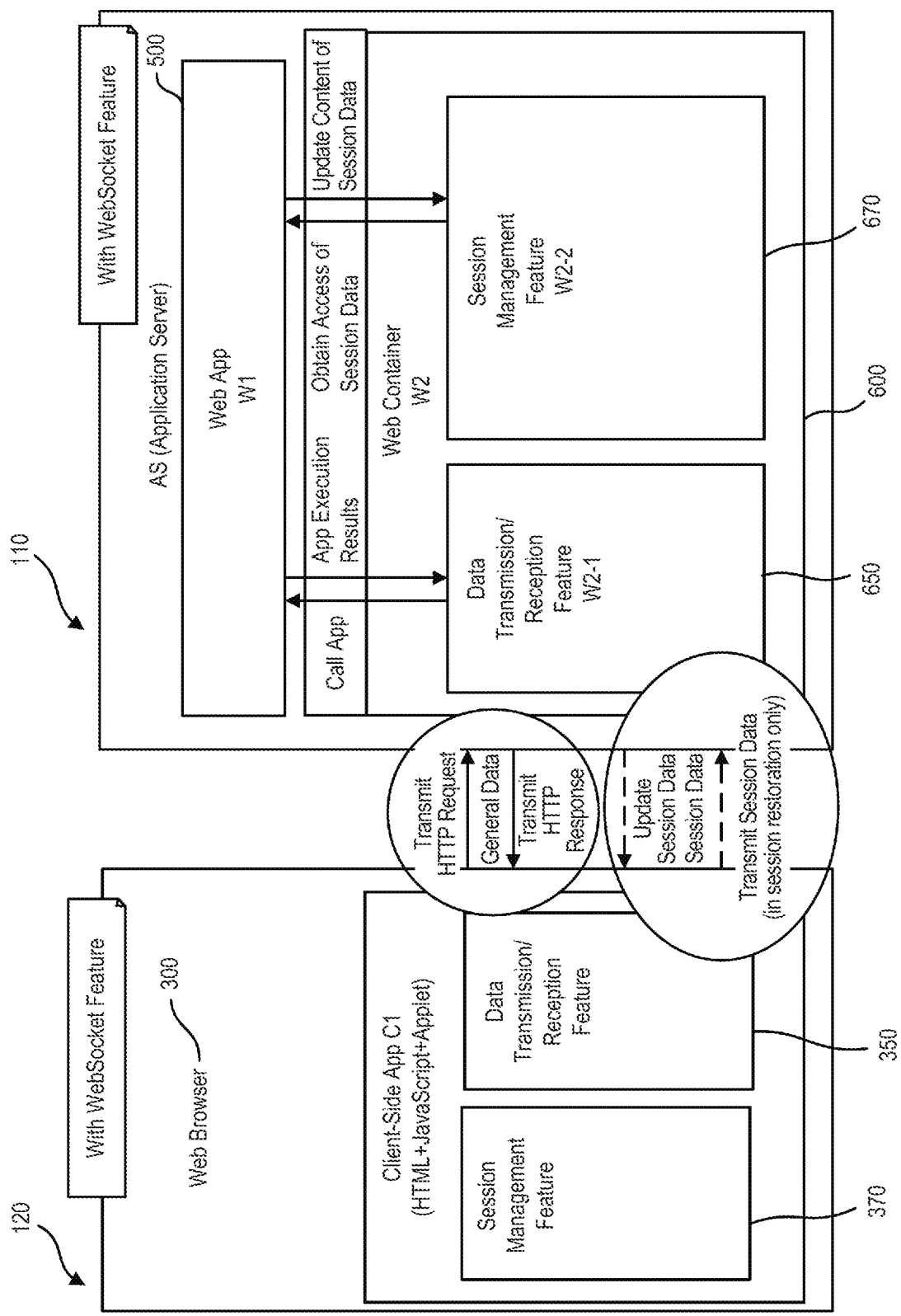
FIG. 9 is a schematic representation regarding client implementation and server implementation in accordance with an embodiment of the present invention.

FIG. 9 is a schematic representation regarding client implementation and server implementation in accordance with an embodiment of the present invention. For example, client 120 (e.g., client 120 of FIG. 5) implementation may include a data transmission/reception feature 350 and a session management feature 370 (e.g., one or more program 440 of FIG. 4 operating on client 120 of FIG. 5). Data transmission/reception feature 350 may include communications with the server 110 using Web Socket, JavaScript, or the like, and an interface of client data transmission/reception feature 350. For example, the interface of client data transmission/reception feature 350 may include an HttpSession interface compliant with the JEE (Java Enterprise Edition) standard specification, which may include the following methods: setAttribute(String, Object) which is available not only for user data but also for management data; removeAttribute(String); getAttributeNames( ); and getAttribute(String). In addition, the methods may include destroy( ) such that since session time-out is managed on the server side, it is called from the server side for discarding the client side session data. It will be appreciated that the Java interface may not be directly implemented, so that it is not necessary to operate the Java EE on the client side. Session management feature 370 may perform management of the Java object received via the data transmission/reception feature 350, and may include implementation by an Applet.

For example, server 110 (e.g., server 110 of FIG. 5) of the present disclosure may include modification to the implementation of a Web container while the server side web application remains to be compliant with JEE standard specification. For example, server 110 (e.g., server 110 of FIG. 5) implementation may include web application 500 and a web container 600 (such as web application server 600 of FIG. 8). Web container 600 may include a data transmission/reception feature 650 and a session management feature 670 (e.g., one or more program 440 operating on server 110 of FIG. 5). In server 110, the HttpSession interface may be compliant with the JEE standard specification. The content of the session data may include management data and user data. Management data may include creationtime (long), long LastAccessedTime (long), ServletContext (Pointer), MaxInactiveInterval (long). User data may include name (String) and object of any serializable object. ServletContext can be newly assigned in a restored JVM#2, and the remaining data items in management data as well as user data may be serializable. Accordingly, in the implementation of the Web container 600, updates of the above data items may be monitored, serialized, and sent by Web Socket to the client side.

Figure 10:
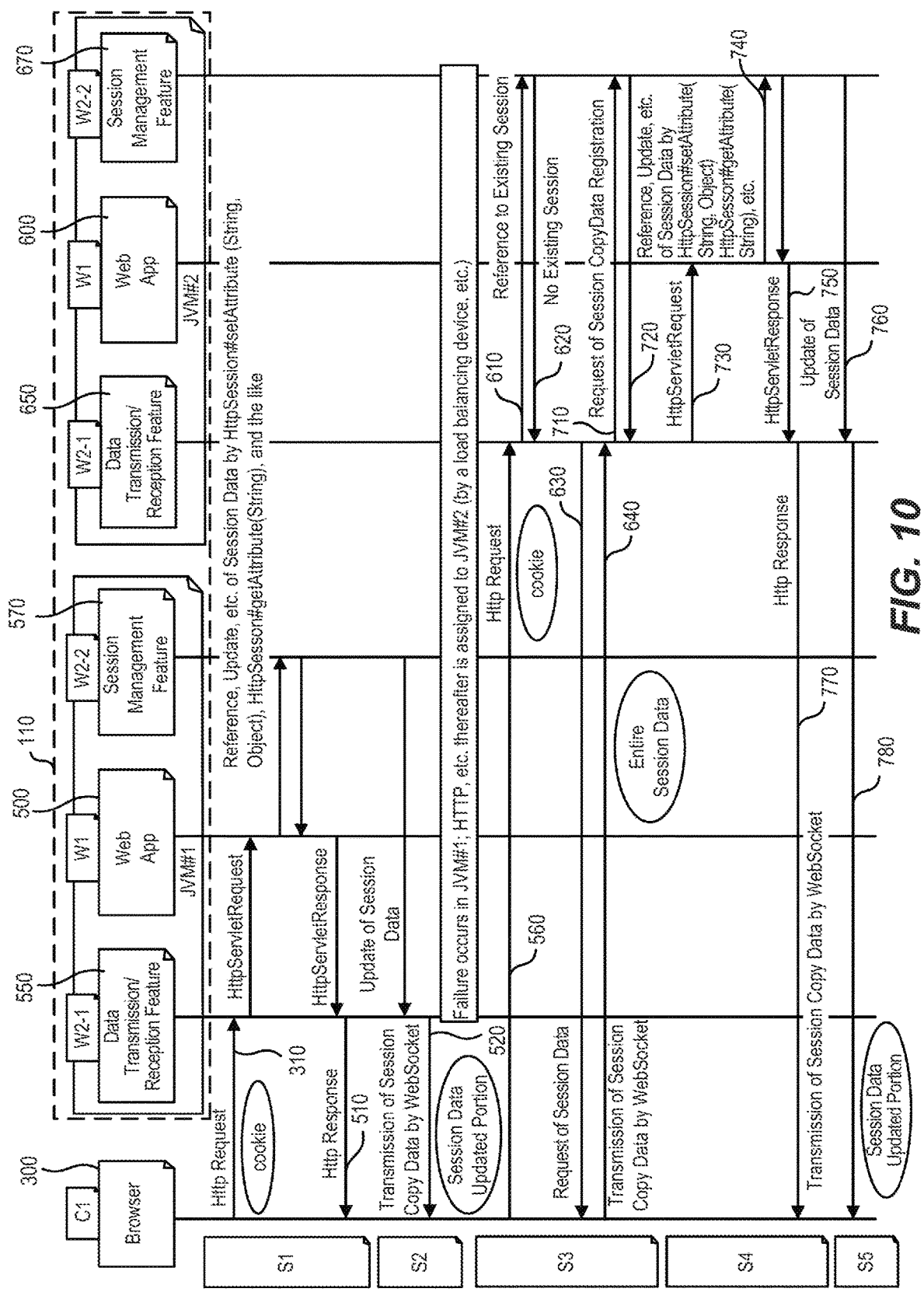
FIG. 10 is a diagram illustrating further processes, for example, for maintaining a session between a server and a client in accordance with one or more embodiments set forth herein.

FIG. 10 is a diagram illustrating further processes, for example, for maintaining a session between a server and a client in accordance with one or more embodiments set forth herein. By way of explanation, in FIG. 10, processes are illustrated from the point of view of a browser 300 (e.g., operating on client 120 and including one or more program 440 of FIG. 4), and a server 110 (e.g., server 110 of FIG. 5 operating one or more program 440 of FIG. 6). For example, initially a user operating browser 300 can affect an http request transmission 310 which is received at data transmission feature 550 of server 110 configured as a web application server 500 (e.g., web application server 500 of FIG. 9) having a Web Socket protocol server feature. Server 110 operating web application server 500 may forward an http response transmission 510 which is received at browser 300. Transmissions 310 and 510 may be general data transmissions between the client and the server. In addition, session management feature 570 of web application server 500 may communicate with data transmission feature 550 of server 110 for transmitting a separate or asynchronous http session data update transmission 520 to web browser 300 which asynchronous http session data update such as a session copy data of the browser 320 is held by browser 300. As described above, a purpose of maintaining a copy of session data by the client provides a countermeasure to a session failure on the server, such as a Java virtual machine failure.

After a failure of web application 500, and in response to browser 300 making an http request 560 which is received at data transmission/reception feature 650 of web application 600, a reference to existing session request 610 is made by transmission/reception feature 650 to session management feature 670, which in response to determination sends as reply 620 that no existing feature exists. Data transmission/reception feature 650 then sends a request for session data 630 to browser 300, which browser 300 sends a transmission of session copy data 640 by Web socket to data transmission/reception feature 650.

A request 710 for session copy data registration is made from data transmission/reception feature 650 to session management feature 670 with a reply 720 back to data transmission/reception feature 650. Data transmission/reception feature 650 sends an http servlet request 730 to web application 600 with reference, update etc. request 740 to session management feature 670, which results in an http servlet response 750 and update of session data 760 to data transmission/reception feature 650. An http response 770 is sent from data transmission/reception feature 650 to browser 300, and a transmission of session copy data 780 is sent from data transmission/reception feature 650 to browser 300.

From the present disclosure, it will be appreciated that session copy data may be held by the client using Web Socket. Thus, it may be possible to reduce complexity and cost of a conventional system in which a copy of session data is held on the server. A purpose of holding session copy data by the client is to provide a countermeasure to a JVM failure in the same or similar manner as in the conventional systems. A reason for using Web Socket is that the timing and frequency of updating the copy of the client session copy data depends upon the setting on the server or the nature of an App. Updating the copy of session copy data every time the session data is updated reflects a trade-off between performance and having the latest copy. When a server experiences a failure such as a JVM failure occurs, session copy data held by the client is transmitted to the server, and thus it is made possible to continue user's operation given the session state at the point prior to the failure recovery. In the updating of the client session copy data, in some embodiments, only those that have been updated are reflected from among a plurality of Java objects that the session data has, so that it is may be possible to reduce the communication data size. By a session timeout on the server, session data on the server may be discarded and, at the same time by the Web Socket communication, the session copy data on the client may also discarded.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the present disclosure and the practical application, and to enable others of ordinary skill in the art to understand the present disclosure as described herein for various embodiments with various modifications as are suited to the particular use contemplated.

The invention claimed is:

1. A computer-implemented method comprising:
   continuously transmitting, by one or more processor of a server, in accordance with a frequency setting on the server, session copy data, from session data on the server for storage on a client, wherein the session between the server and the client is maintained at the server by a first application executing on the server, wherein the transmitted session copy data comprises a portion of the session data, wherein the portion comprises session data different from the session stored session copy data;
   detecting, by the one or more processor, a loss of session data on the server resulting in a session failure between the client and the first application, the loss of session data indicating a failure of the first application;
   based on detecting the loss of session data on the server, requesting, by the one or more processor, transmission of the stored session copy data from the client;
   receiving, by the one or more processor, the stored session copy data from the client;
   configuring, by the one or more processor, a second application executing on the server to take over the session between the server and the client based on the stored session data from the client; and
   resuming, by the one or more processor, the session, with the second application, wherein the session is maintained at the server by the second application, wherein the resuming comprises continuing an operation in the session at a point in the session prior to the failure recovery of the first application, based on a portion of the stored session data from the client.

2. The computer-implemented method of claim 1, further comprising:
   detecting, by the one or more processor, a timeout of the session.

3. The computer-implemented method of claim 2, further comprising:
   discarding, by the one or more processor, the portion of the stored session data from the client.

4. The computer-implemented method of claim 1, wherein the continuously transmitting is performed over a bidirectional communication between the server and the client.

5. The computer-implemented method of claim 1, wherein the requesting is performed over a bidirectional communication between the server and the client.

6. The computer-implemented method of claim 1, further comprising:
   continuing, by the one or more processor, the session with the client using only a portion of the received session copy data.

7. The computer-implemented method of claim 1, wherein the continuously transmitting comprises transmitting the session copy data from the server for storage in a browser on the client.

8. The computer-implemented method of claim 1, wherein the continuously transmitting employs a Web Socket protocol or a Comet protocol between the server and the client.

9. The computer-implemented method of claim 1, wherein the requesting employs a Web Socket protocol or a Comet protocol between the server and the client.

10. The computer-implemented method of claim 1, wherein the loss of session data is due to a Java virtual machine failure.

11. The computer-implemented method of claim 1, wherein the session copy data comprises http session data.

12. The computer-implemented method of claim 1, further comprising discarding the session copy data on the server in response to session time out on the server.

13. A computer program product comprising:
    a computer readable storage medium readable by one or more processing unit and storing instructions for execution by one or more processor for performing a method comprising:
       continuously transmitting, by the one or more processor of a server, in accordance with a frequency setting on the server, session copy data, from session data on the server for storage on a client, wherein the session between the server and the client is maintained at the server by a first application executing on the server, wherein the transmitted session copy data comprises a portion of the session data, wherein the portion comprises session data different from the session stored session copy data;
       detecting, by the one or more processor, a loss of session data on the server resulting in a session failure between the client and the first application, the loss of session data indicating a failure of the first application;
       based on detecting the loss of session data on the server, requesting, by the one or more processor, transmission of the stored session copy data from the client;
       receiving, by the one or more processor, the stored session copy data from the client;
       configuring, by the one or more processor, a second application executing on the server to take over the session between the server and the client based on the stored session data from the client; and
       resuming, by the one or more processor, the session, with the second application, wherein the session is maintained at the server by the second application, wherein the resuming comprises continuing an operation in the session at a point in the session prior to the failure recovery of the first application, based on a portion of the stored session data from the client.

14. The computer program product of claim 13, wherein the continuously transmitting and requesting are performed over a bidirectional communication between the server and the client.

15. A system comprising:
    a memory;
    one or more processor in communication with the memory; and program instructions executable by the one or more processor via the memory to perform a method comprising:

continuously transmitting, by the one or more processor of a server, in accordance with a frequency setting on the server, session copy data, from session data on the server for storage on a client, wherein the session between the server and the client is maintained at the server by a first application executing on the server, wherein the transmitted session copy data comprises a portion of the session data, wherein the portion comprises session data different from the session stored session copy data;

detecting, by the one or more processor, a loss of session data on the server resulting in a session failure between the client and the first application, the loss of session data indicating a failure of the first application;

based on detecting the loss of session data on the server, requesting, by the one or more processor, transmission of the stored session copy data from the client;

receiving, by the one or more processor, the stored session copy data from the client;

configuring, by the one or more processor, a second application executing on the server to take over the session between the server and the client based on the stored session data from the client; and resuming, by the one or more processor, the session, with the second application, wherein the session is maintained at the server by the second application, wherein the resuming comprises continuing an operation in the session at a point in the session prior to the failure recovery of the first application, based on a portion of the stored session data from the client.

16. The system of claim 15, wherein the continuously transmitting and requesting are performed over a bidirectional communication between the server and the client.

17. The system of claim 15, the method further comprising:

continuing, by the one or more processor, the session with the client using only a portion of the received session copy data.

\* \* \* \* \*